3,842,041
SOLID STATE MANUFACTURE OF POLYESTERS
Anthony Arthur Briarly Browne and James Eric McIntyre, Harrogate, England, assignors to Imperial Chemical Industries Limited, London, England
No Drawing. Filed July 13, 1973, Ser. No. 378,937
Int. Cl. C08g 17/003
U.S. Cl. 260—75 M                 20 Claims

ABSTRACT OF THE DISCLOSURE

A process for the manufacture of a poly(a'kylene arylene dicarboxylate) wherein an aromatic dicarboxylic acid in the solid state is reacted with a diol or a diol monoacylate to form a poly(alkylene arylene dicarboxylate), wherein reaction conditions are so controlled that throughout the reaction a major part of the reaction mass forms a solid phase.

---

The present invention relates to the manufacture of polyesters by reaction in the solid phase.

In the manufacture of polyesters, the initial stage may be the reaction of a dicarboxylic acid with a diol or with ethylene oxide the resultant ester or mixture of ester and oligomers being thereafter subjected to polycondensation, at least initially in the liquid phase, the final stages possibly being carried out in the solid phase. Thus hitherto solid phase polycondensation has demanded previous preparation of a suitable form of prepolymer, for example in the form of particles, demanding special equipment.

According to the present invention we provide a process for the manufacture of a poly(alkylene arylene dicarboxylate) wherein an aromatic dicarboxylic acid in the solid state is reacted with a diol or a diol monoacylate to form a poly(alkylene arylene dicarboxylate), wherein reaction conditions are so controlled that throughout the reaction a major part of the reaction mass forms a solid phase.

Preferably, the aromatic dicarboxylic acid should be in particulate form. Preferably, particulate form should be retained throughout the reaction.

Prefarably, the whole of the reaction medium apart from the diol or diol monoacylate, should be solid. Preferably the diol or diol monoacylate should be in the vapour state.

However, we include the situation wherein a minor proportion of the condensed phase is liquid, provided that the bulk of the condensed phase retains a particulate form throughout the reaction. This liquid component, when it exists, may consist of a minor amount of low-melting intermediate ester or oligomeric ester or of a minor amount of diol or diol monoacylate absorbed into or condensed upon the solid particles. Similarly, minor amounts of catalytic additives may be present as liquid provided that the bulk of the condensed phase retains a particulate form.

Advantageously, the reaction may be carried out under fluidised bed condtions in order to improve uniformity of reaction conditions, to facilitate intimate contact between the particulate solid aromatic dicarboxylic acid and the diol or diol monoacylate when in the vapour state and to minimise adhesion of the particles by sintering.

In the term "poly(alkylene arylene dicarboxylate)" we include homopolyesters and also copolyesters in which a minor proportion of the alkylene groups and/or the arylene dicarboxylate groups are of structure different from that of the major proportion.

The advantages of solid phase polycondensation are well known. An advantage of the process of our invention is that since the esterification reaction also takes place in the solid phase, the polycondensation to form high molecular weight poly(alkylene arylene dicarboxylate) can be carried out without the need for intermediate solidification of a reaction melt followed by comminution to a suitable particle size. This is particularly advantageous when the solid phase is in a particulate form.

Aromatic dicarboxylic acids for use in the process of our invention must melt at a temperature above the reaction temperature, preferably at a temperature at least 100° C. above the reaction temperature. Particularly preferable for use in the invention are aromatic dicarboxylic acids with melting points above 300° C., such as terephthalic acid, naphthalene - 2,6 - dicarboxylic acid, naphthalene-2,7-dicarboxylic acid, 1,2-diphenoxyethane-p,p'-dicarboxylic acid, 1,4-diphenoxy butane-p,p'-dicarboxylic acid, biphenyl-4,4'-dicarboxylic acid, diphenyl sulphone-4,4'-dicarboxylic acid, bibenzyl-4,4'-dicarboxylic acid, stilbene-4,4'-dicarboxylic acid, 1,2-di-p-carboxybenzoyloxyethane and 1,6-di-p-carboxybenzamido hexane. More than one such high-melting aromatic dicarboxylic acid may be present, provided that the proportion of other dicarboxylic acid or acids is such that solid particulate structure is maintained during reaction. Minor amounts of lower melting dicarboxylic acids, including aliphatic acids such as adipic acid, may be present but if more than about 10% of an acid melting below the reaction temperature is present a solid particulate structure can no longer be maintained.

Suitable diols and diol monoacylates are, for example, ethylene glycol, 2-hydroxyethyl acetate and 1:3-propane diol.

The polyester produced by the process most melt at a temperature above the final polymerisation temperature. In practice this means that the polyester should preferably melt at a temperature above 200° C. Consequently not all combinations of otherwise suitable aromatic dicarboxylic acids and diols or diol monoacylates are suitable for use in the process of our invention. Among combinations that are suitable are the following:

| Acid | Diol or diol acylate |
|---|---|
| Terephthalic acid | Ethylene glycol. |
| Do. | 2-hydroxyethyl acetate. |
| Naphthalene-2,6-dicarboxylic acid | Ethylene glycol. |
| Naphthalene-2,7-dicarboxylic acid | Do. |
| 1,2-diphenoxyethane-p,p'-dicarboxylic acid | Do. |
| 1,4-diphenoxybutane-p-p'-dicarboxylic acid | Do. |
| Biphenyl-4,4'-dicarboxylic acid | Do. |
| | 1:3-propane diol. |
| Diphenyl sulphone-4,4'-dicarboxylic acid | Ethylene glycol. |
| | 1:3-propane diol. |
| Bibenzyl-4,4'-dicarboxylic acid | Ethylene glycol. |
| Stilbene-4,4'-dicarboxylic acid | Do. |
| 1,2-di-p-carboxybenzoyloxyethane | Do. |
| 1,6-di-p-carboxybenzamido hexane | Do. |

It is a feature of the process of our invention that reaction of the dicarboxylic acid with the diol or diol monoacylate and polycondensation occur simultaneously within the bed, so that high-melting oligomeric species and unchanged aromatic acid are both present at an intermediate stage of the process, with only a minor amount of low-melting oligomeric species. This situation contrasts with conventional processes for polyester manufacture, in which a high concentration of low-melting oligomeric species is built up at an intermediate stage, and virtually all the free aromatic dicarboxylic acid is consumed before manufacture of polymeric species commences.

The presence of an esterification catalyst is advantageous. Such esterification catalysts may be incorporated in the solid dicarboxylic acid before reaction, or if volatile, may be introduced, or have their level of concentration maintained by being vapourised into a chemically inert gas stream which is subsequently passed into contact with the dicarboxylic acid. Preferred esterification catalysts are those commonly used to promote polycondensation reactions in the preparation of polyesters, for example, compounds of antimony, germanium, tin and titanium.

It is important to obtain a balance between esterification by the diol or diol monoacylate and polycondensation reactions such that the concentration of low-melting oligomeric species remains low. The temperature at which such a balance can be attained depends upon polymer structure, vapour feed rate, and catalyst concentrations, but will usually lie within the range 160–240° C. It will be understood that where a separate final powder polymerisation is carried out the temperature of this step may be above 240° C. if the product melting point is sufficiently high, and also that our process may be carried out in such a way that the reaction temperature is increased as the degree of conversion into polymer increases, and in such cases the temperature in the latter stages may exceed 240° C.

If diol or diol monoacrylate is fed to the bed for too long a time fusion of the bed occurs due to reaction of the diol or diol monoacylate with high-melting polymeric species already present to convert them into low-melting hydroxyl- or acyl-ended oligomeric species. It is therefore essential to cease introducing diol or diol monoacylate into the bed before excessive amounts of such low-melting species are formed. It is preferable to introduce diol or diol monoacylate continuously or discontinuously into the bed until the ratio of reacted glycol units to total aromatic dicarboxylic acid and ester units in the bed exceeds 0.95:1, and preferably exceeds 1:1. The upper limit of this ratio depends upon the combination of diol or diol monoacylate and aromatic dicarboxylic acid. Thus in the case of ethylene glycol and terephthalic acid it is undesirable to continue feeding glycol to the bed beyond the point where the molar ratio of reacted glycol units to total aromatic dicarboxylic acid and ester units in the bed exceeds about 1.1:1. In general, the higher the melting point of the resulting polyester the higher the molar ratio of reacted glycol units to total aromatic dicarboxylic acid and ester units in the bed that can be attained without fusion. Thus in the case of ethylene glycol and sulphonyl-4,4'-dibenzoic acid the ratio may reach 1.2:1 without destroying the particulate form.

It is permissible and useful to vary the rate of feed of diol or diol acylate as reaction proceeds, and in particular to reduce the rate of feed as the ratio of reacted glycol units to total aromatic dicarboxylic acid and ester units in the bed increases.

If the rate of feed of diol or diol acylate into the bed is too low, the total reaction time becomes excessive. On the other hand, if the rate of feed is too high the balance between esterification by the diol or diol acylate and polycondensation is shifted towards the former reaction so that an excessive concentration of low-melting oligomeric species is produced and fusion results. The higher the melting point of the resulting polyester, the higher the rate of feed permissible without fusion occurring.

In producing polyesters by this process it is useful after discontinuing the feed of diol or diol monoacylate to continue to polymerise the solid particulate product in order to obtain higher molecular weights. Although the product when such feed is discontinued may be a mixture of high-melting polymeric species and dicarboxylic acids, including unchanged starting materials, equilibration occurs during further thermal treatment to produce a solid product consisting of high melting polymeric species. It is permissible and useful to resume feed of diol or diol acylate for a short period during or after this equilibration provided that the ratio of reacted glycol units to total aromatic dicarboxylic acid and ester units in the bed does not become too high. For instance, in the case of ethylene glycol and terephthalic acid, it should not exceed about 1.1:1.

The process may be carried out batchwise. It may also be carried out continuously, for example by feeding aromatic dicarboxylic acid continuously into the first stage of a multi-stage reactor.

The poly(alkylene arylene dicarboxylates) of our invention are suitable for the manufacture of fibres, films or mouldings.

In the following Examples of our invention all parts are by weight.

EXAMPLE 1

65 parts of terephthalic acid of mean particle size 100μ were blended with 0.13 parts of tetra isopropyl titanate and heated in a fluidising reactor at 220° C. in a nitrogen stream (7.5 parts per minute). Ethylene glycol vapour (5.07 parts per minute) was fed into the nitrogen stream for 20 hours. Extraction of the resultant particulate material with dilute sodium carbonate to remove carboxylic acids gave 26 parts of poly(ethylene terephthalate) of number average molecular weight 1028. Powder polymerisation of the residual low molecular weight poly (ethylene terephthalate) at 220° C. under nitrogen alone gave polymer which was pressed at 270° C. to give a clear film of IV 0.38 (1% solution in o-chlorophenol at 25° C.).

EXAMPLE 2

65 parts of terephthalic acid of mean particle size 100μ were blended with 0.13 parts of tetra isopropyl titanate and 0.65 parts of tri-n-butylphosphine oxide and heated in a fluidising reactor at 220° C. in a nitrogen stream (7.5 parts per minute). Ethylene glycol vapour (5.5 parts per minute) was fed into the nitrogen stream for 20 hours. The product then contained 45 parts of low molecular weight poly(ethylene terephthalate), along with carboxylic acids. After heating at 220° C. under nitrogen alone for 20 hours all the material in the reactor was converted to particulate poly(ethylene terephthalate) of IV 0.37 (1% solution in o-chlorophenol at 25° C.). The polymer was converted into a clear film.

This example illustrates the importance of terminating the ethylene glycol flow before all the carboxylic acid has reacted so that the desired particulate form is retained.

EXAMPLE 3

65 parts of terephthalic acid of mean particle size 100μ were blended with 0.13 parts of tetra isopropyl titanate and heated in a fluidising reactor at 220° C. in a nitrogen stream (7.5 parts per minute). Ethylene glycol vapour (7.8 parts per minute) was fed into the nitrogen stream for 20 hours. The product was a clear melt. This example shows that feeding glycol into the solid reactant for too long leads to glycolysis and formation of a molten monomeric product.

What we claim is:

1. A process for the manufacture of poly(alkylene arylene dicarboxylate) wherein an aromatic dicarboxylic acid in the particulate solid state is reacted with a diol or a diol monoacylate to form a poly(alkylene arylene dicarboxylate), wherein reaction conditions are so controlled that throughout the reaction a major part of the reaction mass forms a particulate solid phase.

2. A process according to claim 1 wherein the whole of the reaction medium apart from the diol or diol monoacylate is solid.

3. A process according to claim 1 wherein the diol or diol monoacylate is in the vapour state.

4. A process according to claim 1 wherein reaction is carried out under fluidised bed conditions.

5. A process according to claim 1 wherein the aromatic dicarboxylic acid is of melting point above 300° C.

6. A process according to claim 1 wherein the aromatic dicarboxylic acid is terephthalic acid, naphthalene-2:6-dicarboxylic acid, naphthalane-2:7-dicarboxylic acid, 1:2- diphenoxyethane-4:4'-dicarboxylic acid, 1:4-diphenoxybutane-4:4'-dicarboxylic acid, biphenyl-4:4'-dicarboxylic acid, diphenyl sulphone-4:4'-dicarboxylic acid, bibenzyl-4:4'-dicarboxylic acid, stilbene-4:4'-dicarboxylic acid. 1:2-di-p-carboxybenzoyloxyethane or 1:6-di-p-carboxybenzamido hexane.

7. A process according to claim 1 wherein the reactants are chosen so that the resultant polyester is of melting point above 200° C.

8. A process according to claim 1 wherein the diol is ethylene glycol.

9. A process according to claim 1 wherein the diol monoacylate is glycol monoacylate.

10. A process according to claim 1 wherein a catalytic amount of an esterification catalyst is present.

11. A process according to claim 10 wherein the esterification catalyst is a compound of antimony, germanium, tin or titanium.

12. A process according to claim 10 wherein the proportion of esterification catalyst present is from 0.01 to 2.0 percent by weight, based on the dicarboxylic acid.

13. A process according to claim 1 wherein the diol or diol monoacylate is vapourised into a chemically inert gas which is passed through the mass of aromatic dicarboxylic acid.

14. A process according to claim 13 wherein the diol or diol monoacylate is vapourised into a chemically inert gas which is passed through the mass of aromatic dicarboxylic acid and the proportion of esterification catalyst present is attained or maintained by volatilisation of the catalyst into the inert gas.

15. A process according to claim 1 wherein the reaction is carried out with the temperature within the range 160–240° C.

16. A process according to claim 1 wherein the diol or diol monoacylate is fed into the dicarboxylic acid until the molecular ratio of reacted diol or diol monoacylate to reacted dicarboxylic acid is greater than 0.95:1.

17. A process according to claim 16 wherein said ratio is greater than 1:1.

18. A process according to claim 16 in which the dicarboxlyic acid is terephthalic acid and said ratio does not exceed 1.1:1.

19. A process according to claim 16 in which the dicarboxylic acid is sulphonyl-4:4'-bibenzoic acid and said ratio does not exceed 1.2:1.

20. A process according to claim 1 wherein diol or diol monoacylate is fed into the reaction mixture with a reducing rate as the reaction proceeds.

References Cited
UNITED STATES PATENTS

| | | |
|---|---|---|
| 2,806,052 | 9/1957 | Siggel. |
| 3,617,226 | 11/1971 | List et al. |
| 3,639,448 | 2/1972 | Matsuzawa et al. |

MELVIN GOLDSTEIN, Primary Examiner

U.S. Cl. X.R.
260—475 F

UNITED STATES PATENT OFFICE
CERTIFICATE OF CORRECTION

Patent No. 3,842,041      Dated October 15, 1974

Inventor(s) Anthony Arthur Briarly BROWNE and James Eric MCINTYRE

It is certified that error appears in the above-identified patent and that said Letters Patent are hereby corrected as shown below:

Please add the following to the front page format after the serial number:

--Claims priority, application Great Britain, July 31, 1972, 34202/72 and November 14, 1972, 52551/72--

Please correct the following typographical errors:

Column 1, line 44, change "Prefarably" to --Preferably--

Column 2, line 32, change "most" to --must--

Signed and sealed this 11th day of February 1975.

(SEAL)
Attest:

RUTH C. MASON
Attesting Officer

C. MARSHALL DANN
Commissioner of Patents
and Trademarks